United States Patent [19]

Williams et al.

[11] 4,181,766

[45] Jan. 1, 1980

[54] LAMINATES COMPRISING WEATHERABLE COATINGS AND PRIMER COMPOSITIONS COMPRISING A MIXTURE OF AN ACRYLIC POLYMER AND A CELLULOSIC ESTER

[75] Inventors: Brian H. Williams, White Bear Lake; J. Lamar Zollinger, Maplewood, both of Minn.

[73] Assignee: Minnesota Mining and Manufacturing Company, St. Paul, Minn.

[21] Appl. No.: 938,867

[22] Filed: Sep. 1, 1978

[51] Int. Cl.$^2$ .............. B32B 7/02; G02B 5/128; B32B 5/16; B32B 27/30
[52] U.S. Cl. .............. 428/216; 350/103; 350/105; 428/325; 428/413; 428/414; 428/447; 428/451; 428/452; 428/510; 428/520; 428/522
[58] Field of Search .............. 428/451, 510, 413, 414, 428/447, 452, 216, 325, 520, 522; 350/103, 105

[56] References Cited

U.S. PATENT DOCUMENTS

| | | | |
|---|---|---|---|
| 1,743,835 | 1/1930 | Stimson | 350/103 |
| 2,310,790 | 2/1943 | Jungersen | 350/109 |
| 2,407,680 | 9/1946 | Palmquist | 350/105 |
| 3,429,840 | 2/1969 | Lowe | 428/463 |
| 3,469,898 | 9/1969 | Altman | 350/103 |
| 3,639,147 | 2/1972 | Benefiel | 428/510 |
| 3,684,348 | 8/1972 | Rowland | 350/103 |
| 3,707,397 | 12/1972 | Gagnon | 428/447 |
| 3,712,706 | 1/1973 | Stamm | 350/103 |
| 3,955,035 | 5/1976 | Ito | 428/447 |
| 4,025,159 | 5/1977 | McGrath | 350/105 |
| 4,049,861 | 9/1977 | Nozari | 428/413 |
| 4,049,867 | 9/1977 | Ito | 428/413 |

*Primary Examiner*—Ellis P. Robinson
*Attorney, Agent, or Firm*—Cruzan Alexander; Donald M. Sell; Mark A. Litman

[57] ABSTRACT

The ability to withstand weathering by acrylic substrates having an abrasion resistant coating comprising a cured epoxy-terminated silane on the surface thereof is improved by using a particular primer composition between the coating and the substrate. The primer comprises a mixture of an acrylic polymer and cellulose esters of carboxylic acids.

18 Claims, No Drawings

LAMINATES COMPRISING WEATHERABLE COATINGS AND PRIMER COMPOSITIONS COMPRISING A MIXTURE OF AN ACRYLIC POLYMER AND A CELLULOSIC ESTER

FIELD OF THE INVENTION

The use of synthetic resin sheets and films in optical and structural environments has often been limited by inherent properties of the resin. Acrylic resins, for example, have many excellent properties, but as with most other resins, they are easily marred and attacked by solvents. Recent advances in the synthetic resin art have produced high performance abrasion and solvent resistant coatings which are particularly useful on polymeric resin substrates. These coatings comprise ambifunctional silanes, and particularly epoxy-functional silanes as taught in U.S. Pat. Nos. 3,955,035; 4,026,826; 4,049,861; and 4,073,967. These coatings are capable of providing both abrasion and solvent resistance to substrates to which they are adhered. Unfortunately, these coatings do not naturally adhere well to all surfaces. As pointed out in U.S. Pat. No. 4,049,861, it is often desirable to use a primer between the coating and the substrate. The selection of a primer often is difficult because the primer must be adherent to both the substrate and the coating. As the last two are themselves not adherent, there are not always primers available which will have the properties necessary to adhere well to both materials. When particular physical requirements are needed in the primer layer in additon to adherence to the substrate and coating, the difficulties in finding a primer are greatly increased.

In the coating of substrates with abrasion resistant coatings derived from epoxy-terminated silanes, problems of weatherability, e.g., durability under conditions of intense light, heat and humidity, often occur. Where the abrasion resistant coating does not naturally adhere well to a substrate weathering will cause the coating to crack and separate. This is particularly evident when the substrate is flexed during use. Even where primers have been found which can enable the coating to be firmly adhered to acrylic substrates, the problem of weathering has not been solved. There appear to be many different factors at play in effecting weatherability, not all of which are known or understood. Properties of the diverse layers such as flexibility, coefficient of thermal expansion, ultraviolet radiation sensitivity, susceptibility to oxidation, water sensitivity, and others appear to play some part in the overall effect of weatherability.

SUMMARY OF THE INVENTION

The present invention relates to a primer which has been found to be useful in producing weatherable laminates, i.e., coatings of epoxy-terminated silanes on acrylic substrates. The invention also relates to multi-layered articles including the coated articles and laminates themselves.

Acrylic substrates according to the practice of the present invention are defined as vinyl polymers comprising at least about 70% by weight of units of methyl methacrylate, having the formula

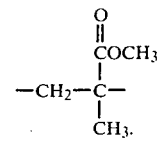

Preferably, the vinyl polymers comprise at least 80% by weight of these units, and most preferably acrylic substrates comprise at least 90% by weight of these units.

Epoxy-terminated silanes are represented by the formulae:

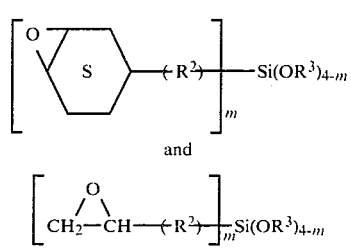

wherein
R² is a non-hydrolyzable divalent hydrocarbon group of fewer than 12 carbon atoms or a divalent group of fewer than 12 carbon atoms the backbone of which is composed of only C and O atoms with no two oxygens adjacent within the backbone of the divalent group,
R³ is an aliphatic hydrocarbon group of fewer than 10 carbon atoms or an acyl group of fewer than 10 carbon atoms, preferably alkyl of 1 to 4 carbon atoms, and
m is 1 or 2.

Preferably R² has the formula

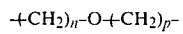

wherein
n is 1 to 4 and
is 1 to 6, and
m is 1.

Most preferably the epoxy-terminated silane is the aliphatic epoxy-terminated silane of formula II. The abrasion resistant coatings are the cured products derived from these monomers in compositions comprising at least about 50 percent by weight of the epoxy-terminated silane and the balance comprising copolymerizable monomers.

The primer layer comprises a compatible blend of:
1. 10 to 85 percent by weight of a polymer comprising untis of the formula

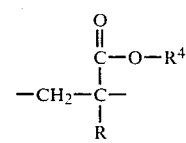

wherein R is hydrogen or methyl and R⁴ is an alkyl group of 1 to 4 carbon atoms, said polymer having no more than 50 percent by weight of said unis having R⁴ groups of more than 2 carbon atoms, and preferably no more than 40 percent by weight and most preferably no more than 30 percent by weight of said units having R⁴ groups of more than 2 carbon atoms, p 2. 15 to 90 percent by weight of cellulose esters of carboxylic acids, said esters having 0.5 to 5.5 percent by weight of unesterified hydroxyl groups and a viscosity at 25° C. of 300 to 10,000 centipoise and an acyl content of up to about 56 percent by weight derived from carboxylic acids having 2 through 4 carbon atoms, with no more than about 20 percent by weight of said acids being derived from carboxylic acids having fewer than 3 carbon atoms, and 3. 0 to 65 percent by weight of an aliphatic epoxy compound.

DETAILED DESCRIPTION OF THE INVENTION

As described above, the acrylic substrates are vinyl polymers and comprise polymethyl methacrylate and copolymers containing at least about 70 percent by weight of methyl methacrylate and other vinyl monomers. Comonomers include those materials generally known in the art to be copolymerizable with methyl methacrylate such as methyl acrylate, ethyl methacrylate, cyclohexyl methacrylate, styrene, vinyl acetate, acrylic acid and the like. Crosslinking agents for acrylic resins which are also well known in the art, such as diallyl phthalate, hexanediol diacrylate, acrylic anhydride and pentaerythritol triacrylate, may also be used in the acrylic substrate. Other additives such as flow control agents, solvents, surfactants, dyes, pigments, particulates, ultraviolet radiation absorbers, etc., may also be present.

The epoxy-terminated silane described above preferably should be applied as a coating of 2 to 30 microns, more preferably 4 to 25 microns and most preferably 5 to 15 mircons as a cured, dry coating. It is desirable to modify this coating by having from 0 to 50 percent by weight of an aliphatic epoxide comonomer therein. More preferably 5 to 40 percent by weight and most preferably 15 to 30 percent by weight of said epoxy comonomer is used. This comonomer tends to increase the flexibility of the abrasion resistant coating.

The preferred epoxy comonomers are represented by the formula:

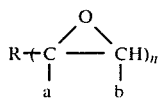

wherein R is an aliphatic or cycloaliphatic radical such that the epoxy compound has a molecular weight of at least about 100 per epoxy group. Aliphatic and cycloaliphatic refer to hydrocarbons which also may have ether or ester oxygens therein. n is the valence of R and is an integer of 1 to 6 (preferably 2). a and b are H or, when fused together, the atoms necessary to form a 5- or 6-member cycloaliphatic ring.

Useful epoxides within this definition include those which contain one or more cyclohexene oxide groups such as the epoxycyclohexanecarboxylates, typified by 3,4-epoxycyclohexylmethyl 3,4-epoxycyclohexanecarboxylate, 3,4-epoxy-2-methylcyclohexylmethyl 3,4-epoxy-2-methylcyclohexanecarboxylate, and bis(3,4-epoxy-6-methylcyclohexylmethyl) adipate. For a more detailed list of epoxy compounds according to the present invention, see U.S. Pat. No. 3,117,099, particularly column 2, line 59–column 4, line 22, which is incorporated herein for that disclosure.

Other useful epoxy compounds include monoglycidyl ethers of alkanols such as ethyl glycidyl ether, butyl glycidyl ether, decyl glycidyl ether and the like; polyglycidyl ethers of aliphatic polyols such as 1,4-butanediol diglycidyl ether, 1,6-hexanediol diglycidyl ether, diethyleneglycol diglycidyl ether, triethyleneglycol diglycidyl ether, polypropyleneglycol diglycidyl ether (e.g., "ERL-4050" and "ERL-4052" from Union Carbide Corp.), diglycidyl ether of 2,5-dioxanediol, and the triglycidyl ether of trimethylolpropane; epoxidized polyolefins such as dipentene dioxide (e.g., "ERL-4269" from Union Carbide Corp.) and epoxidized polybutadiene butadiene (e.g., Oxiron 2001 from FMC Corp.). Other useful aliphatic epoxy compounds are disclosed in *Handbook of Epoxy Resins*, McGraw-Hill Book Co. (1967). The preferred epoxy compound is 1,4-butanediol diglycidyl ether.

It is also desirable to add from 0 to 10% by weight of an untraviolet radiation absorber to the coating. Preferably 0.25 to 5 percent by weight of ultraviolet radiation absorber is used. Such materials include benzophenones, benzotriazoles, substituted acrylates and aryl esters, and may be blended, dissolved or reacted into the coating layer. Particularly good absorbers include 2-hydroxy-4-methoxy-benzophenone, 2-hydroxy-4-octyloxy-benzophenone, 4-dodecyloxy-2-hydroxy-benzophenone, 2,2'-dihydroxy-4,4'-dimethoxy-benzophenone, 2-(2'-hydroxyphenyl)benzotriazole, 2-(2'-hydroxy-5'-methylphenyl)benzotriazole, 2-(2'-hydroxy-5'-t-octylphenyl)benzotriazole, ethyl-2-cyano-3,3-diphenylacrylate, 2-ethylhexyl-2-cyano-3,3-diphenyl acrylate, dimethyl-p-methoxybenzylidenemalonate ester, phenyl salicylate, p-t-octylphenyl salicylate, resorcinol monobenzoate, etc. The classes known in the art as substituted 2-hydroxybenzophenones and substituted 2-(2'-hydroxyphenyl)benzotriazoles are the most preferred absorbers. They can also be used in the primer and substrate.

It is also desirable to put antioxidants into the abrasion resistant coatings. They also can be used in the primer layer and substrate.

Antioxidants, in their broadly understood sense, are materials which are able to slow the rate of oxidation in oxidizable materials. Antioxidants are well known in the art (e.g., "Antioxidants," Charles S. Abramoff, 1975–1976 Modern Plastics Encyclopedia, pp. 162–164; Antioxidants Chart, 1975–1976 Modern Plastics Encyclopedia, pp. 657–659) and work by various mechanisms, the most common of which are free radical scavenging and peroxide decomposition. These mechanisms respectively work by reacting with chain-propagating radicals and converting peroxides to harmless oxidized species. Of the well known antioxidants, the preferred antioxidants are the organic phenols. Examples of these materials are hydroquinone, hydroquinone monomethyl ether, hydroquinone monoethyl ether, hydroquinone t-butyl ether, benzoquinone, p-methoxy phenol. Preferred antioxidants are the hindered phenols such as 2,6-di(t-butyl)-4-hydroxymethylphenol and 1,3,5-trimethyl-2,4,6-tris(3,5-di-t-butyl-4-hydroxybenzyl)benzene. The non-basic or non-nitrogen containing antioxidants are generally preferred. The amount of these antioxidants used in polymer compositions can be quite small. When used, amounts in the range of 0.001 to 10 percent by weight of the abrasion resistant layer or the primer layer can be effective. Preferably less than 3 percent by weight of the abrasion resistant layer is antioxidant.

A particularly useful substrate in the practice of the present invention is acrylic retroreflective substrates and sheeting. Retroreflective materials are well known in the art and generally are of two classes. One class uses embedded materials (e.g., retroreflective spheres) to converge light onto a backing material. The second class has the surface of the sheet textured and coated with a reflective material so as to reflect incident light back along the incident beam. Representative references are U.S. Pat. Nos. 2,310,790; 2,407,680; and 4,025,159 for embedded retroreflective sheeting and U.S. Pat. Nos. 1,743,835; 3,469,898; 3,684,348; and 3,712,706 for surface modified retroreflective materials.

The embedded class of retroreflective materials generally uses spherical or particularly microspherical particles to converge the light onto a reflective backing. The microspheres are generally smaller than 400 micrometers in diameter and preferably less than 200 micrometers. The microspheres are usually made of glass or ceramic materials.

The preferred surface structure for surface modified retroreflective sheeting is what is known in the art as cube cornered retroreflective surfaces. This type of sheeting may or may not have a reflective coating on the cube corner faces.

The following examples will further illustrate the present invention.

EXAMPLE 1

A thermoplastic film comprising poly(methyl methacrylate) and 6% by weight of a copolymer of n-butyl acrylate/styrene (85/15) and 0.6% by weight of 2-(3',5'-di-tert-butyl-2'-hydroxyphenyl)-5-chlorobenzotriazole ultraviolet radiation absorber was embossed on the lower surface to form a retroreflective, cube-cornered sheet of about 125 microns in thickness.

A primer composition comprising a 20% by weight solution in isopropyl acetate of a 4:2:1 mixture of (1) a polyacrylate component consisting of a copolymer of methyl methacrylate and n-butyl methacrylate (3:1 weight ratio having an inherent viscosity at 25° C. of 0.19 as a solution of 0.25 grams copolymer in 50 ml CHCl$_3$), (2) a cellulose ester component, cellulose acetate butyrate (20 sec., 7,600 centipoise according to ASTM D-817-65 (Formula A) and D-1343-56 and having 13 weight percent acetyl and 37 weight percent butyryl content) and 2% by weight of resorcinol monobenzoate, and (3) an epoxide component, 3,4-epoxycyclohexyl-methyl-3,4-epoxycyclohexane, carboxylate, was coated onto the upper surface of the retroreflective sheet with a number 36 wire would rod giving a dried thickness of about 7.5 microns.

The primed retroreflective sheet was then coated with the following formulation as 50% by weight solids in isopropyl acetate:
 (1) 80 parts of a 40% hydrolyzed prepolymer of 3-glycidoxypropyltrimethoxy silane,
 (2) 20 parts of 1,4-butanediol diglycidyl ether, and
 (3) 100 parts of an isopropyl acetate solution composed of 1 part (CF$_3$SO$_2$)$_2$CHC$_6$H$_5$ catalyst, 2 parts 2-(3'-5'-di-tert-amyl-2'-hydroxyphenyl) benzotriazole (ultraviolet radiation absorber), 2 parts 2,6-di-tert-butyl-4-hydroxymethyl phenol, and 0.2 parts of an inert, oligomeric fluoropolymer leveling agent.

The formulation was coated with a number 22 wire wound rod giving a dried thickness of 16 microns and then allowed to cure at room temperature overnight.

The coated article was then evaluated for its physical properties.

Using the proposed G.S.A. Specification LS-300C test for abrasion resistance on reflective sheeting (substituting CS-10F wheels for the proposed CS-10 wheels), the coated product displayed no wear after 300 revolutions with a 250 gram load. The uncoated retroreflective substrate showed considerable wear after 10 revolutions with a 250 gram load.

A crosshatch adhesion of 100% was obtained using #250 pressure sensitive adhesive paper tape (3M Co.).

Accelerated weathering tests were then performed on the coated sheet after mounting it on an aluminum panel. Test conditions and results were as follows:

1. The carbon arc test (designated "CA"): The sheet was subjected to a sunshine carbon arc source at a distance of about 25.4 cm, having a black panel temperature of 62° C., at an air temperature of 52° C., at an alternating cycle of 102 minutes of irradiation and 18 minutes of irradiation with a deionized water spray maintaining the relative humidity at about 35%. There was no visible failure after more than 2000 hours. At 2000 hours a sample was removed and subjected to a crosshatch adhesion test with #250 and #610 pressure sensitive adhesive tapes (3M Co.). Again 100% crosshatch adhesion was displayed.

2. The ultraviolet, condensing moisture test (designated "UCM"): A 40 watt ultraviolet emitting lamp having a peak output of 315 nm was used to expose the panel at a distance of 6 cm to alternating cycles of 4 hours of ultraviolet radiation at 60° C. and 4 hours of condensing moisture at 50° C. Samples survived between 600 and 800 hours before visible cracking appeared.

EXAMPLES 2–6

These examples show the weatherability of laminate systems of the present invention with various abrasion resistant coating compositions. The weathering tests indicated are those described in the previous example, and the percentages of original reflectance, where shown, are reflectances after 2000 hours of testing at a reflectance angle of 0.5°. The carbon arc test is noted as CA in the table and the reflectance noted as CA-R. The ultraviolet and condensing moisture test is noted as UCM. All coatings were applied as in Example 1. The epoxy, UV absorber and antioxidant components of the abrasion resistant coating formulations are indicated in the table below. These components of the abrasion resistant coating formulations are given in the table as parts by weight, said components being used in formulations representing variations of that described in Example 1.

| Ex. No. | Components of the Abrasion Resistant Coating | | | | | | CA Hrs. | CA-R % | UCM Hrs. |
| --- | --- | --- | --- | --- | --- | --- | --- | --- | --- |
| | A | B | C | D | E | F | | | |
| 2 | | | 20 | 2 | 2 | | >2000 | 104 | 608 |
| 3 | 20 | | | 2 | 1 | 1 | >2000 | 28 | 608 |
| 4 | | 20 | | 2 | 1 | 1 | 1443 | 55 | 776 |
| 5 | 20 | | | 2 | 2 | | 1163 | | 608 |
| 6 | | 20 | | 2 | 2 | | 1443 | 74 | 776 |

The primer composition used was identical to that used in Example 1.

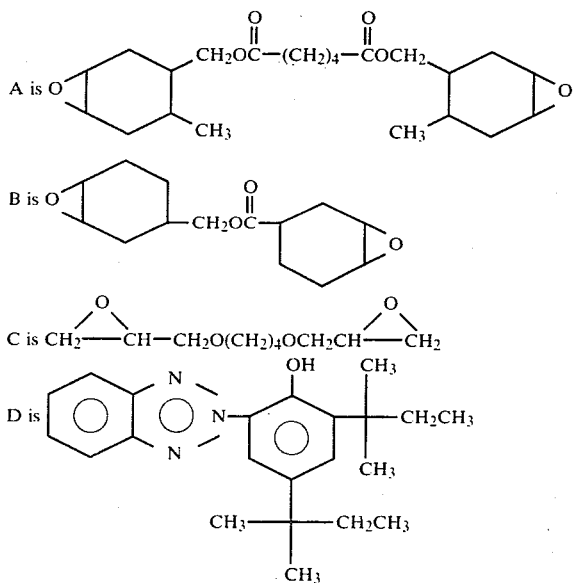

E is p-methoxy-2,6-di-t-butylphenol, and
F is 1,3,5,-trimethyl-2,4,6-tris[3,5-di-t-butyl-4-hydroxybenzyl]benzene.

EXAMPLES 7-17

The following examples show the importance of the limitation that no more than about 50% by weight of the polyacrylate component of the primer has units with $R^4$ groups of more than 2 carbon atoms. The primer compositions are identical to that in Example 1 except that the polyacrylate component, the copolymer of methyl methacrylate and n-butyl methacrylate was replaced with the indicated acrylate polymers and where necessary, because of the high molecular weights of certain acrylate components, additional solvent was used to reduce the viscosity to a more coatable state. Coating procedures and adhesion testing were otherwise identical. Inherent viscosities, where indicated, were taken at 25° C. from 0.50% solids solutions in chloroform on a No. 50 Cannon-Fenske viscometer. Brookfield viscosities were taken at 25° C. from 40% solids solution in toluene.

| Example | Polyacrylate Component | Adhesion % |
|---|---|---|
| 7 | a | >95 |
| 8 | b | 100 |
| 9 | c | 100 |
| 10 | d | 70 |
| 11 | e | 0 |
| 12 | f | 0 |
| 13 | g | 0 |
| 14 | h | 100 |
| 15 | i | 10 |
| 16 | j | >95 |
| 17 | k | 100 |

(a) a low molecular weight poly(methyl methacrylate) having an inherent viscosity of 0.20,
(b) a medium molecular weight poly(methyl methacrylate) having an inherent viscosity of 0.45,
(c) a very high molecular weight poly(methyl methacrylate) having an inherent viscosity of 1.20,
(d) a very high molecular weight poly(ethyl methacrylate) having an inherent viscosity of 0.91,
(e) a high molecular weight poly(n-butyl methacrylate) having an inherent viscosity of 0.53,
(f) a high molecular weight poly(isobutyl methacrylate) having an inherent viscosity of 0.66,
(g) a high molecular weight copolymer (50/50) of n-butyl methacrylate and isobutyl methacrylate having an inherent viscosity of 0.61,
(h) a copolymer (71/29 parts by weight) of methyl methacrylate and ethyl acrylate having a Brookfield viscosity of 1400 centipoise,
(i) a copolymer (40/60 weight percent) of methyl methacrylate and butyl methacrylate having a Brookfield viscosity of 360 centipoise,
(j) a copolymer (73/27 weight percent) of ethyl methacrylate and methyl acrylate having a Brookfield viscosity of 590 centipoise, and
(k) a copolymer (53/47 weight percent) of methyl methacrylate and ethyl acrylate having a Brookfield viscosity of 530 centipoise.

As can be seen, where the acrylate component in the primer comprised only a material having $R^4$ groups in excess of two carbon atoms, there was no satisfactory adhesion of the abrasion resistant coating to the substrate.

EXAMPLES 18-32

These examples show that the selection of cellulose esters of carboxylic acids as one of the components is critical and that many alternative materials do not work well. The composition of the abrasion resistant coating was identical to that of Example 1. The composition of the primer in these examples comprised by weight 4 parts of the acrylic copolymer used in Example 1, 1 part of epoxy B, 28 parts of isopropyl acetate and 2 parts of the candidate material. The compositions were coated and tested in the same fashion as in Example 1.

| Ex. No. | Material | Solubility | Primer Adhesion (Initial) % | Abrasion Resistant Coating Adhesion (Initial) % |
|---|---|---|---|---|
| 18 | (1) | Soluble | 100 | 20 |
| 19 | (2) | soluble | 100 | — |
| 20 | (3) | Soluble | 100 | — |
| 21 | (4) | Soluble | 100 | 90 |
| 22 | (5) | Soluble | 100 | — |
| 23 | (6) | Soluble | 100 | 100 |
| 24 | (7) | Insoluble | — | — |
| 25 | (8) | Insoluble | — | — |
| 26 | (9) | Insoluble | — | — |
| 27 | (10) | Insoluble | — | — |
| 28 | (11) | Soluble | 100 | 40 |
| 29 | (12) | Insoluble | 100 | — |
| 30 | (13) | Insoluble | — | — |
| 31 | (14) | Soluble | 100 | — |
| 32 | (15) | Soluble | 100 | — |

The candidate materials were as follows:
(1) a thermosetting acrylic resin "Carboset 525" (Goodrich),
(2) component (a) of Example 7,
(3) component (j) of Example 16,
(4) poly(vinyl acetate),
(5) polyester plasticizer, Santicizer 429 (Monsanto),
(6) cellulose acetate propionate,
(7) a copolymer of maleic anhydride and methyl vinyl ether,
(8) poly(vinyl alcohol), (9) cellulose acetate,
(10) Estane 5703, polyurethane,
(11) (92/5/3 weight percent) terpolymer of methyl methacrylate, glycidyl methacrylate, and γ-methacryloxypropyltrimethoxy silane as 35.6% solids in 95/5 toluene methanol, primer composition diluted to 20% solids with isopropyl acetate,
(12) poly(vinylbutyral),
(13) carboxymethyl cellulose,
(14) VMCH vinyl chloride/vinyl acetate copolymer ~86:14, and
(15) (94.5/5.5) copolymer of isooctyl acrylate and acrylamide, as 25.6% solids in primer composition diluted to 20% solids with isopropyl acetate.

As can be seen from the above examples, only the composition containing the cellulose ester of propionic acid showed 100% initial adhesion when used as a replacement of the cellulose acetate butyrate component used in Example 1. Laminates showing less than 100% initial abrasion resistant coating adhesion do not withstand weathering.

EXAMPLES 33-41

The following examples evaluate candidate materials for use in place of the polyacrylate component of the primer. Four parts by weight of the candidate component is added to 2 parts of the cellulose acetate butyrate component used in Example 1, and 1 part of epoxy component E of Example 6. The primer compositions were coated as in Example 1; however, Examples 34, 35, 40 and 41 were prepared as 15% solids in isopropyl acetate. Primer mixtures of Examples 34 and 40 were not totally compatible.

| Ex. No. | Polyacrylate Replacement Component | Solubility | Primer Adhesion (Initial) % | Abrasion Resistant Coating Adhesion % |
|---|---|---|---|---|
| 33 | 1 | Insoluble | — | — |
| 34 | 4 | Soluble | ~100 | 100 |
| 35 | 6 | Soluble | <20 | — |
| 36 | 11 | Insoluble | — | — |
| 37 | 12 | Insoluble | — | — |
| 38 | 14 | Insoluble | — | — |
| 39 | 15 | Insoluble | — | — |
| 40 | b | Soluble | 100 | 100 |
| 41 | d | Soluble | 100 | 70 |

As can be seen from these examples of the materials investigated, no substitute was found for the polyacrylate component of the primer of the invention as described earlier. Only polyacrylates having $R^4$ groups as ethyl or less work well in the present invention.

EXAMPLES 42-65

These examples evaluate the variation in proportions of the various ingredients of the primer layer. The abrasion resistant coating and the methods of application, cure, and testing are the same as in Example 1. The polyacrylate component, the cellulose ester component, and the epoxy component are those used in Example 1. All materials were dissolved in isopropyl acetate having the percent primer solids content shown.

| Ex. No. | Polyacrylate Wt. % | Cellulose Ester Wt. % | Epoxy Wt. % | Primer Solids % | Adhesion % |
|---|---|---|---|---|---|
| 42 | 85.7 | 0 | 14.3 | 20 | 0 |
| 43 | 71.4 | 14.3 | 14.3 | 20 | 95 |
| 44 | 42.8 | 42.9 | 14.3 | 20 | 100 |
| 45 | 28.6 | 57.1 | 14.3 | 14 | 97 |
| 46 | 14.3 | 71.4 | 14.3 | 10.5 | 85 |
| 47 | 57.1 | 14.3 | 28.6 | 20 | 100 |
| 48 | 57.1 | 0 | 42.8 | 20 | 0 |
| 49 | 71.4 | 28.6 | 0 | 20 | 100 |
| 50 | 42.8 | 28.6 | 28.6 | 20 | 100 |
| 51 | 28.6 | 28.6 | 42.8 | 20 | 100 |
| 52 | 14.3 | 28.6 | 57.1 | 20 | 100 |
| 53 | 0 | 28.6 | 71.4 | 20 | 0 |
| 54 | 100 | 0 | 0 | 20 | 0 |
| 55 | 0 | 100 | 0 | 20 | 0 |
| 56 | 10 | 90 | 0 | 16 | >90 |
| 57 | 30 | 70 | 0 | 16 | 100 |
| 58 | 50 | 50 | 0 | 17 | 100 |
| 59 | 85 | 15 | 0 | 19 | 10 |
| 60 | 43 | 13 | 44 | 18.5 | 100 |
| 61 | 29 | 16 | 55 | 19 | >90 |
| 62 | 20 | 18 | 62 | 19 | >90 |
| 63 | 12 | 43 | 45 | 16 | >85 |
| 64 | 11 | 59 | 30 | 15 | >75 |
| 65 | 20 | 80 | 0 | 15 | >90 |

This data shows the criticality of the polyacrylate and cellulose ester components and the usefulness of the epoxy components. It also shows the useful minimum amounts of the polyacrylate and cellulose ester component.

EXAMPLES 66-85

These examples evaluate the importance of the relative thicknesses of the primer and abrasion resistant coating layers. The coating compositions used were prepared in isopropyl acetate and are variations of those prepared in Example 1. The methods of application, except for the size of the coating rods and the percent solids of the coatings indicated below, were the same. After application of the abrasion resistant coating, the coated film was sprayed with paint, dried for several hours and then washed with a 50/50 methylethyl ketone and toluene solution to measure the durability of the adhesion properties and the anti-graffiti properties of the laminates.

| | Thickness | | % Solids in Coating Solutions | | % Adhesion | |
|---|---|---|---|---|---|---|
| Ex. No. | Dried Primer μ | Abrasion Resistant Coating μ | Primer* | Abrasion Resistant* | Initial | Final |
| 66 | 0.25 | 2.54 | 5 (3) | 40 (8) | 0 | 0 |
| 67 | 0.25 | 5.08 | 5 (3) | 45 (14) | 0 | 0 |
| 68 | 0.25 | 7.62 | 5 (3) | 40 (20) | 0 | 0 |
| 69 | 0.25 | 10.16 | 5 (3) | 50 (22) | 0 | 0 |
| 70 | 1.27 | 2.54 | 10 (14) | 40 (8) | 0 | 0 |
| 71 | 1.27 | 5.08 | 10 (14) | 45 (14) | 0 | 0 |
| 72 | 1.27 | 7.62 | 10 (14) | 40 (20) | 0 | 0 |
| 73 | 1.27 | 10.16 | 10 (14) | 50 (22) | 0 | 0 |
| 74 | 2.54 | 2.54 | 10 (22) | 40 (8) | 100 | 100 |
| 75 | 2.54 | 5.08 | 10 (22) | 45 (14) | 100 | 100 |
| 76 | 2.54 | 7.62 | 10 (22) | 40 (20) | 100 | 90 |
| 77 | 2.54 | 10.16 | 10 (22) | 50 (22) | 50 | 50 |
| 78 | 5.08 | 2.54 | 20 (22) | 40 (8) | 100 | 100 |
| 79 | 5.08 | 5.08 | 20 (22) | 45 (14) | 100 | 100 |
| 80 | 5.08 | 7.62 | 20 (22) | 40 (20) | 100 | 100 |
| 81 | 5.08 | 10.16 | 20 (22) | 50 (22) | 100 | 100 |
| 82 | 7.62 | 2.54 | 20 (36) | 40 (8) | 100 | 100 |
| 83 | 7.62 | 5.08 | 20 (36) | 45 (14) | 100 | 100 |
| 84 | 7.62 | 7.62 | 20 (36) | 40 (20) | 100 | 100 |

| | Thickness | | % Solids in | | | |
|---|---|---|---|---|---|---|
| | Dried | Abrasion Resistant | Coating Solutions | | % Adhesion | |
| Ex. No. | Primer μ | Coating μ | Primer* | Abrasion Resistant* | Initial | Final |
| 85 | 7.62 | 10.16 | 20 (36) | 50 (22) | 100 | 100 |

*The number within the parentheses indicates the number (size) of the wire in the wire wound rod used to coat out the materials.

It can be seen from these data that the primer layer should be at least 1.8μ thick, most preferably at least 2.5μ thick. The abrasion resistant coating loses some of its adhesion when more than about four times as thick as the primer layer. This thickness of the abrasion resistant coating is the preferred maximum relative thickness of the coating to that of the primer.

Other materials may be added to the various layers of the composites of the present invention. For example, dyes, pigments, flexibilizers, fillers, magnetic particles, etc., may be useful materials in certain constructions. Different variations of the composites may also be used. For example, in the use of the embedded retroreflective substrates, either encapsulated lens sheeting or enclosed lens sheeting may be used. Enclosed lens sheeting has the retroreflective material, e.g., the microspheres, embedded in and coated on all surfaces by a transparent plastic binder with a reflector coat (e.g., metal layer) behind the microsphere layer. Encapsulated lens sheeting has the retroreflective material partially embedded into the surface of a transparent plastic binder, the retroreflective layer being protected by a transparent film supported above that layer by walls rising from the binder in which the retroreflective material is embedded. A reflector coat is again positioned behind the microsphere layer. The supporting walls of the transparent film are generally in a pattern, as for example a repeating hexagonal pattern.

What is claimed is:

1. A multi-layered article comprising an acrylic substrate comprising at least 70% by weight of units having the formula:

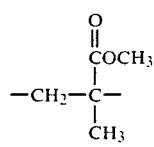

having coated on one surface thereof a composition comprising:

(a) 10 to 85 percent by weight of an acrylic polymer comprising repeating units of the formula

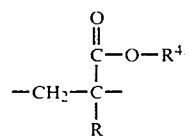

wherein R is H or CH$_3$ and R$^4$ is an alkyl group of 1 to 4 carbon atoms, said polymer having no more than 50% by weight of said repeating units having R$^4$ groups of more than 2 carbon atoms, (b) 15 to 90 percent by weight of cellulose esters of carboxylic acids, said esters having 0.5 to 5.5 percent by weight of unesterified hydroxyl groups, a viscosity at 25° C. of 300 to 10,000 centipoise, and an acyl content of no more than 56 percent by weight derived from carboxylic acids having 2 to 4 carbon atoms and no more than 20 percent by weight of said acyl content being derived from carboxylic acids having fewer than 3 carbon atoms, and (c) 0 to 65 percent by weight of an aliphatic epoxy compound, and coated over said composition an abrasion resistant coating comprising the cured product of an epoxy-terminated silane.

2. The article of claim 1 wherein said epoxy-terminated silane is selected from the group consisting of:

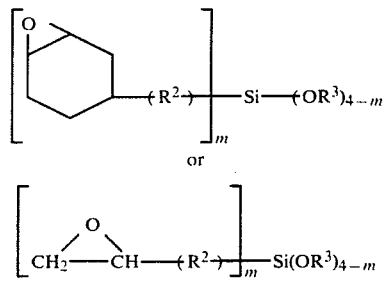

wherein
R$^2$ is a non-hydrolyzable divalent group of fewer than 12 carbon atoms, the backbone of which is composed of only C and O atoms or only C atoms, with no two oxygen atoms adjacent within the backbone of the divalent group,
R$^3$ is selected from the groups consisting of an aliphatic hydrocarbon group of fewer than 10 carbon atoms and an acyl group of fewer than 10 carbon atoms, and
m is 1 or 2.

3. The article of claim 1 wherein said epoxy-terminated silane is represented by the formula

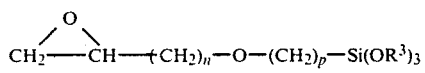

wherein
n is 1 to 4,
p is 1 to 6, and
R$^3$ is alkyl of 1 to 4 carbon atoms.

4. The article of claim 2 wherein said abrasion resistant coating has a dry thickness of 2 to 30 microns and said cured composition contains 50 to 95 percent by weight of units derived from said epoxy-terminated silane, said coating further comprising at least 0.25% by weight of an ultraviolet radiation absorber, at least 0.001 percent by weight of an antioxidant, and at least 5% by weight of an aliphatic epoxide comonomer.

5. The article of claim 2 wherein said cellulose esters comprise an ester selected from the group consisting of cellulose acetate butyrate and cellulose acetate propionate.

6. The article of claim 4 wherein said cellulose esters comprise an ester selected from the group consisting of cellulose acetate butyrate and cellulose acetate propionate.

7. The article of claim 4 wherein said cellulose esters comprise an ester selected from the group consisting of cellulose acetate butyrate and cellulose acetate propionate, said acrylic polymer comprises a polymer which is selected from the class consisting of poly(methyl methacrylate) and poly(ethyl methacrylate), and said ultraviolet radiation absorbers are selected from the class consisting of benzophenones and benzotriazoles.

8. The article of claim 1 wherein said acrylic substrate comprises a retroreflective substrate.

9. The article of claim 5 wherein said acrylic substrate comprises a retroreflective substrate.

10. The article of claim 1 wherein said acrylic substrate comprises a retroreflective substrate.

11. The article of claim 5 wherein said epoxy-terminated silane comprises 3-glycidoxypropyltrimethoxy silane.

12. The article of claim 10 wherein said epoxy-terminated silane comprises 3-glycidoxypropyltrimethoxy silane.

13. The article of claim 2 wherein said composition has a dried coating thickness of at least 1.8 microns and said abrasion resistant coating layer is between 2 and 30 microns and is no more than four times the thickness of said composition.

14. The article of claim 5 wherein said composition has a dried coating thickness of at least 1.8 microns and said abrasion resistant coating layer is between 2 and 30 microns and is no more than four times the thickness of said composition.

15. The article of claim 7 wherein said composition has a dried coating thickness of at least 1.8 microns and said abrasion resistant coating layer is between 2 and 30 microns and is no more than four times the thickness of said composition.

16. The article of claim 12 wherein said composition has a dried coating thickness of at least 1.8 microns and said abrasion resistant coating layer is between 2 and 30 microns and is no more than four times the thickness of said composition.

17. The article of claim 7 wherein the aliphatic epoxy compound in said composition is 3,4-epoxycyclohexylmethyl-3,4-epoxycyclohexane carboxylate.

18. The article of claims 8, 9, or 10 wherein said retreflective sheeting comprises enclosed lens sheeting or encapsulated lens sheeting.

* * * * *

UNITED STATES PATENT AND TRADEMARK OFFICE
CERTIFICATE OF CORRECTION

PATENT NO. : 4,181,766
DATED : January 1, 1980
INVENTOR(S) : Brian H. Williams and J. LaMar Zollinger It is certified that error appears in the above-identified patent and that said Letters Patent are hereby corrected as shown below:

Column 2, line 42, "is 1 to 6" should be --p is 1 to 6--;

Column 2, line 64, "unis" should be --units--;

Column 2, line 68, "p 2. 15 to 90 per-" should be --2. 15 to 90 per- --.("p" should be lmitted and "2." should start a new paragraph);

Column 5, line 51, "wire would rod" should be --wire wound rod--;

Column 10, line 11, "42.8" should be --42.9--; and

Column 13, line 13, Claim 10, "of claim 1" should be --of claim 7--.

Signed and Sealed this

Twenty-fourth Day of June 1980

[SEAL]

Attest:

SIDNEY A. DIAMOND

Attesting Officer

Commissioner of Patents and Trademarks